United States Patent
Chae et al.

(10) Patent No.: US 10,760,621 B2
(45) Date of Patent: Sep. 1, 2020

(54) CLUTCHING DEVICE OF AN AUTOMATIC TRANSMISSION

(71) Applicants: HYUNDAI MOTOR COMPANY, Seoul (KR); KIA MOTORS CORPORATION, Seoul (KR)

(72) Inventors: Minho Chae, Suwon-si (KR); Juhyeon Park, Suwon-si (KR); Yong Uk Shin, Suwon-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 122 days.

(21) Appl. No.: 16/150,726

(22) Filed: Oct. 3, 2018

(65) Prior Publication Data
US 2020/0018393 A1 Jan. 16, 2020

(30) Foreign Application Priority Data
Jul. 16, 2018 (KR) .......................... 10-2018-0082076

(51) Int. Cl.
*F16D 25/0638* (2006.01)
*F16D 125/10* (2012.01)
*F16H 63/30* (2006.01)
*F16D 121/04* (2012.01)

(52) U.S. Cl.
CPC ...... *F16D 25/0638* (2013.01); *F16D 2121/04* (2013.01); *F16D 2125/10* (2013.01); *F16H 2063/303* (2013.01)

(58) Field of Classification Search
None
See application file for complete search history.

(56) References Cited

U.S. PATENT DOCUMENTS 5,232,418 A * 8/1993 Aoki ................... F16D 25/0638
192/48.61
5,511,644 A * 4/1996 Murata ................... F16D 13/52
192/109 F (Continued)

FOREIGN PATENT DOCUMENTS

JP 2009-185928 A 8/2009
JP 2015-190526 A 11/2015

*Primary Examiner* — Ernesto A Suarez
*Assistant Examiner* — James J Taylor, II
(74) *Attorney, Agent, or Firm* — Brinks Gilson & Lione

(57) ABSTRACT

A clutching device of an automatic transmission includes: a clutch drum connected with a first rotation element, a clutch connected with the clutch drum and also a second rotation element, and a piston unit to operate the clutch. In particular, the piston unit includes: a first piston forming a first sealed space with the first rotation element and the clutch drum and moving toward the clutch to directly press the clutch by a hydraulic pressure supplied to the first space, a second piston forming a second sealed space with the first piston and the first rotation element, a spring retainer arranged on the first rotation element and forming a third sealed space with the first and second pistons and the first rotation element, a first return spring disposed between the first and second pistons, and a second return spring disposed between the spring retainer and the second piston.

14 Claims, 5 Drawing Sheets

(56) References Cited

U.S. PATENT DOCUMENTS

| | | | | |
|---|---|---|---|---|
| 5,950,787 | A * | 9/1999 | Murasugi | F16D 25/06 |
| | | | | 192/85.25 |
| 6,758,786 | B2 * | 7/2004 | Lepelletier | F16H 3/663 |
| | | | | 192/106 F |
| 7,104,381 | B2 | 9/2006 | Miyazaki et al. | |
| 8,074,778 | B2 * | 12/2011 | Jayaram | F16D 25/0638 |
| | | | | 192/114 R |
| 8,491,434 | B2 * | 7/2013 | Meyer | F16D 25/0638 |
| | | | | 192/85.32 |
| 9,255,634 | B2 | 2/2016 | Sasaki et al. | |
| 9,695,930 | B2 | 7/2017 | Deutsch et al. | |
| 2012/0247913 | A1 * | 10/2012 | Nakano | F16D 23/06 |
| | | | | 192/18 A |
| 2018/0347639 | A1 * | 12/2018 | Ishizaka | F16D 25/14 |

\* cited by examiner

CLUTCHING DEVICE OF AN AUTOMATIC TRANSMISSION

CROSS-REFERENCE TO RELATED APPLICATION

This application claims priority to and the benefit of Korean Patent Application No. 10-2018-0082076, filed on Jul. 16, 2018, the entire contents of which are incorporated herein by reference.

FIELD

The present disclosure relates to a clutching device of an automatic transmission.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

For enhancing fuel consumption, a high efficiency engine, various approaches, such as a high efficiency transmission, a light-weight vehicle body, etc. are under investigation, and in particularly, in the transmission field, a double clutch transmission and an automated manual transmission are also under research to compromise efficiency of a manual transmission and convenience of an automatic transmission.

In such a transmission, dry or wet clutches are used to transmit an engine torque, and a clutch used for a transmission desires a large torque capacity and precise control.

Until friction members of clutch disks and clutch plates of such a clutch meet each other, a rapid operating speed is desired for immediate starting of power transmission, and after the friction members have met, large engaging force is desired for ensuring power delivery through the clutch.

We have discovered that a clutch designed for rapid operating speed and large engagement force undermines operating efficiency due to the lack of precise control to determine when the rapid operating speed and large engagement force are both required or not based on operation condition of the transmission.

Furthermore, the clutch may be damaged by fatigue accumulation by repeated application of a large engagement force and a rapid operating speed.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a clutching device of an automatic transmission having advantages of enhanced shifting responsiveness and precise control.

A clutching device of an automatic transmission according to an exemplary form includes: a clutch drum connected with a first rotation element, a clutch connected with the clutch drum and also connected with a second rotation element to connect or disconnect torque delivery between the first and second rotation elements, and a piston unit to operate the clutch to connect the torque delivery between the first and second rotation elements. In particular, the piston unit includes: first and second pistons, a spring retainer, and first and second return springs.

The first piston may form a first sealed space with the first rotation element and the clutch drum and may move toward the clutch to directly press the clutch by a hydraulic pressure supplied to the first sealed space through a first hydraulic line formed in the first rotation element. The second piston may form a second sealed space with the first piston and the first rotation element. The spring retainer may be arranged on the first rotation element and may form a third sealed space with the first and second pistons and the first rotation element. A second hydraulic line to supply hydraulic pressure to the third sealed space may be formed in the first rotation element. The first return spring may be disposed between the first piston and the second piston to provide a first restoring force to the first and second pistons. The second return spring may be disposed between the spring retainer and the second piston to provide a second restoring force to the spring retainer and the second piston.

The piston unit may further include a first stopper disposed on the first rotation element and arranged between the first and second pistons to limit a moving stroke of the second piston.

The first stopper may be formed as a snap ring fitted on the first rotation element and arranged between the first and second hydraulic lines, and limits a return direction stroke of the second piston.

The spring retainer may be abutted by a second stopper in a direction toward the clutch to support the second return spring, and may tightly contact an exterior rim of the first piston by interposing a seal. The second hydraulic line may be formed in the first rotation element at a location between the second piston and the spring retainer such that a compensation hydraulic pressure may be formed in the third sealed space by receiving a hydraulic pressure through the second hydraulic line.

The second stopper may be formed as a snap ring fitted on the first rotation element.

An exterior rim of the first piston may be axially elongated in parallel with the clutch drum and may slidably contact the clutch drum by interposing a sealing.

Interior rims of the first and second pistons may be slidably arranged on the first rotation element and may contact the first rotation element by interposing a sealing, respectively.

An exterior rim of the second piston may be slidably contact the exterior rim of the first piston by interposing a sealing.

The first rotation element may be an input shaft that receives an output torque of an engine. The second rotation element may be one rotation element of three rotation elements of a planetary gear set.

A third hydraulic line may be formed in the first rotation element at a location between the first and second pistons to supply a compensation hydraulic pressure to the second sealed space.

According to an exemplary form of the present disclosure, dual pistons are used for operation of a clutch that transmits torque, thereby improving shifting responsiveness due to better gap control between friction members, and also improving power delivery efficiency by ensuring a large engagement force.

Due to sequentially controlling of the first and second pistons, fatigue accumulation caused to the friction members may be significantly reduced, thereby reducing possibility of damage to the clutch.

In the case of releasing the clutch, drag loss of friction members may be reduces while enhancing reliability of controlling the clutch by cancelling centrifugal force of fluid remaining in spaces between the pistons and the clutch drum, since the returning operation of the pistons initiated by a return spring is accelerated by the compensation hydraulic pressure supplied to a space between the spring retainer and the second piston.

Since a return spring initiates the returning operation of the pistons, unstableness of returning operation of pistons may be reduced by minimizing effect of unstableness of low initial hydraulic pressure when the hydraulic pressure is solely used for returning the pistons.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
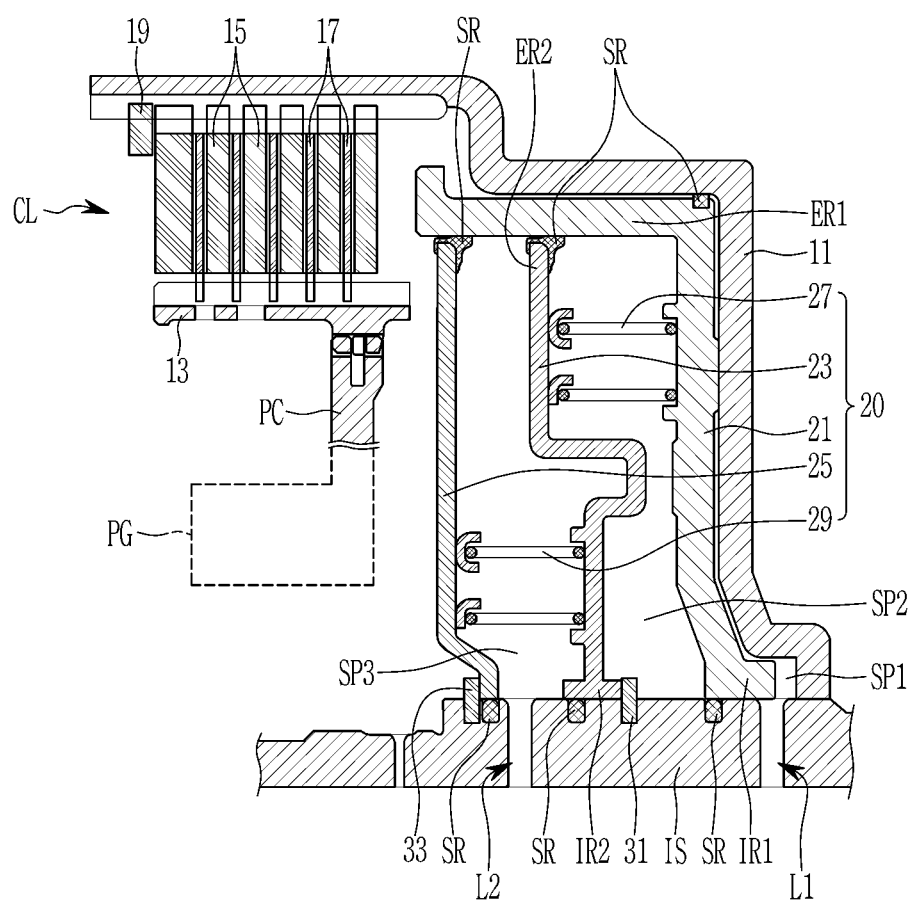
FIG. 1 is a cross-sectional view of a clutching device of an automatic transmission according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a cross-sectional view of a clutching device of an automatic transmission according to a first exemplary form of the present disclosure.

Referring to FIG. 1, a clutching device of an automatic transmission is a clutching device that is arranged between two rotation elements to control torque transmission therebetween.

The exemplary form takes an example that torque transmission between an input shaft IS and a planet carrier PC of a planetary gear set PG as two rotation elements is controlled, i.e., connected or disconnected.

Various types of planetary gear sets, e.g., a single pinion planetary gear set, a double pinion planetary gear set, a compound planetary gear set, etc., may be applied with a clutching device of the form. The planetary gear set PG includes three rotation elements of a sun gear, a planet carrier PC, and a ring gear. As well known in the art, the planet carrier PC rotatably supports a plurality of pinion gears that are externally gear-meshed with the sun gear, and the ring gear is internally gear-meshed with the plurality of pinion gears.

A clutching device according to a first exemplary form includes a clutch CL connected with a clutch drum 11 and also connected with a clutch hub 13, and a piston unit 20 that controls an operation of the clutch CL. The clutch CL controls torque transmission between the clutch drum 11 and the clutch hub 13 according to an operating state of friction members 15 and 17 installed in the clutch CL in response to the operation of the piston unit 20.

The clutch drum 11 is fixedly connected with the input shaft IS to rotate at a same speed. The input shaft is a mere example of a member that receives or outputs a torque. Thus, it may be connected with the engine output side to receive an engine torque, or it may be connected to a rotation element of another planetary gear set included in an automatic transmission.

The clutch hub 13 is fixedly connected with the planet carrier PC to rotate at a same speed. The planet carrier PC is a mere example of a member that receives or outputs a torque. Thus, it may be understood that the clutch hub 13 may be connected with another rotation element of the planetary gear set PG.

A plurality of clutch plates 15 as the friction members of the clutch CL are spline-engaged with an interior circumference of the clutch drum 11. A plurality of clutch disks 17 as the friction members of the clutch CL are spline—engaged with an exterior circumference of the clutch hub 13. Thus, when the clutch CL is operated, the friction members of the clutch plates 15 and the clutch disks 17 frictionally meet each other, thereby enabling torque transmission between the clutch drum 11 and the clutch hub 13, which means torque transmission between the input shaft IS and the planet carrier PC is enabled.

The plurality of clutch disks 17 are alternately arranged with the plurality of clutch plates 15, and an assembly of the clutch disks and plates 17 and 15 is supported by a snap ring 19.

The piston unit 20 includes a dual piston arrangement of first and second pistons 21 and 23, first and second return springs 27 and 29 for applying a restoring force to the first and second pistons, and a spring retainer 25 that supports the second return spring 29.

The piston unit 20 operates to apply engagement pressure to clutch CL by application of hydraulic pressure to the piston unit 20.

The first piston 21 forms a first sealed space SP1 with the input shaft IS and the clutch drum 11, and a first hydraulic line L1 is formed in the input shaft IS. Therefore, the first piston 21 moves toward the clutch CL when a hydraulic pressure is supplied to the first space SP1 through the first hydraulic line L1. When forwardly moved, the first piston 21 directly pushes the clutch plates and disks 15 and 17 to contact each other.

The second piston 23 forms a second sealed space SP2 with the first piston 21 and the input shaft IS. In more detail, an interior rim IR2 of the second piston 23 slidably contacts the input shaft interposing a sealing SR and an exterior rim ER2 of the second piston 23 slidably contacts an exterior rim ER1 of the first piston 21.

The spring retainer 25 is arranged on the input shaft IS and forms a third sealed space SP3 with the first and second pistons and the input shaft IS. In more detail, an exterior end of the spring retainer 25 contacts the exterior rim ER1 of the first piston 21 and an interior end of the spring retainer 25 fixedly mounted on the input shaft IS interposing a sealing SR.

A second hydraulic line L2 to supply hydraulic pressure to the third sealed space is formed in the first rotation element at a location between the spring retainer 25 and the second piston 23.

A first stopper 31 is disposed on the input shaft IS at a location between the first and second pistons 21 and 23 to limit a moving stroke of the second piston 23.

The first stopper 31 may be formed as a snap ring fitted on the input shaft IS at a location between the first and second hydraulic lines L1 and L2.

The exterior rim ER1 of the first piston 21 slidably contacts the clutch drum 11, air-tightly by interposing a sealing SR. The exterior rim ER2 of the second piston 23 slidably contacts the exterior rim ER1 of the first piston 21, air-tightly by interposing a sealing SR.

Interior rims IR1 and IR2 of the first and second pistons 21 and 23 are slidably mounted on the input shaft IS, and air-tightly contacts the input shaft IS by interposing a sealing SR respectively.

The spring retainer 25, formed in a generally disk shape, is abutted by a second stopper 33 in a direction toward the clutch CL to support the second return spring 29, and air-tightly contacts the exterior rim ER1 of the first piston 23 interposing a seal SR.

A second hydraulic line L2 communicating with the third sealed space SP3 is formed in the input shaft IS to supply a compensation hydraulic pressure to the third sealed space SP3.

The second stopper 33 may be formed as a snap ring fitted on the input shaft IS.

The first return spring 27 is stored in the second sealed space SP2 and is abutted by the first and second pistons 21 and 23 to apply a first restoring force to the first and second pistons 21 and 23. The first return spring 27 may be formed as a coil spring.

The second return spring 29 is stored in the third sealed space SP3 and is abutted by the spring retainer 25 and the second piston 23 to apply a second restoring force to the spring retainer 25 and the second piston 23. The second return spring 29 may be formed as a coil spring.

Figure 2:
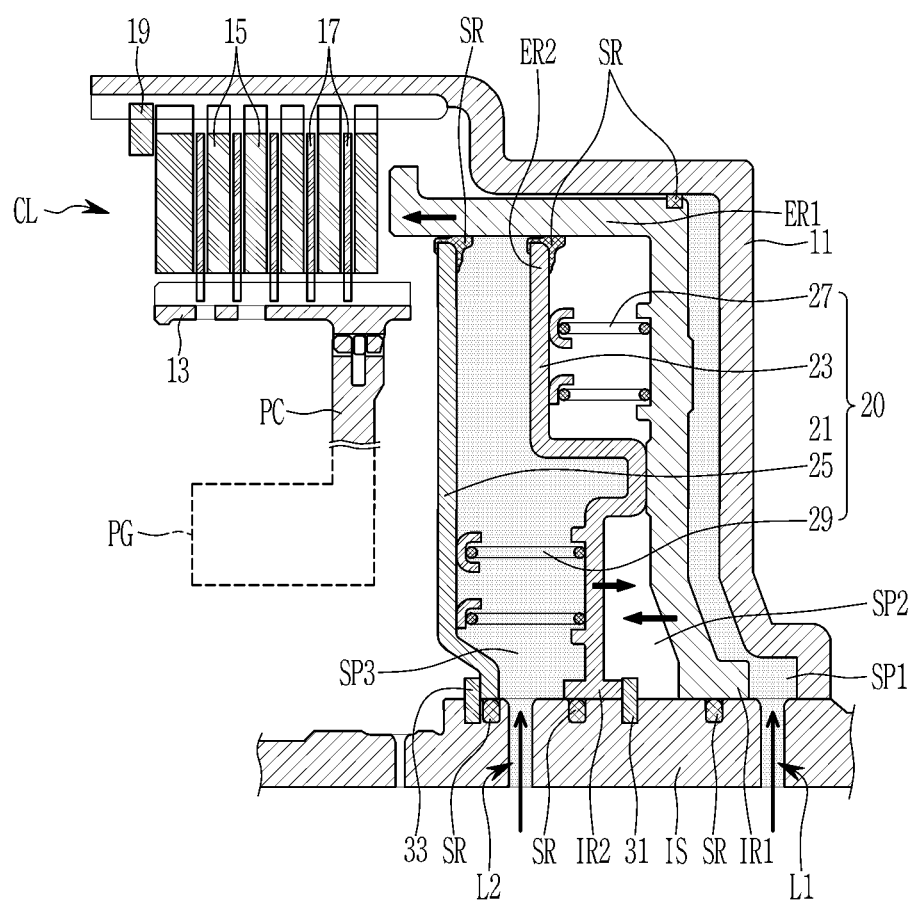
FIG. 2 is a cross-sectional view illustrating a first stage of a clutching device of an automatic transmission according to a first exemplary form of the present disclosure.
Figure 3:
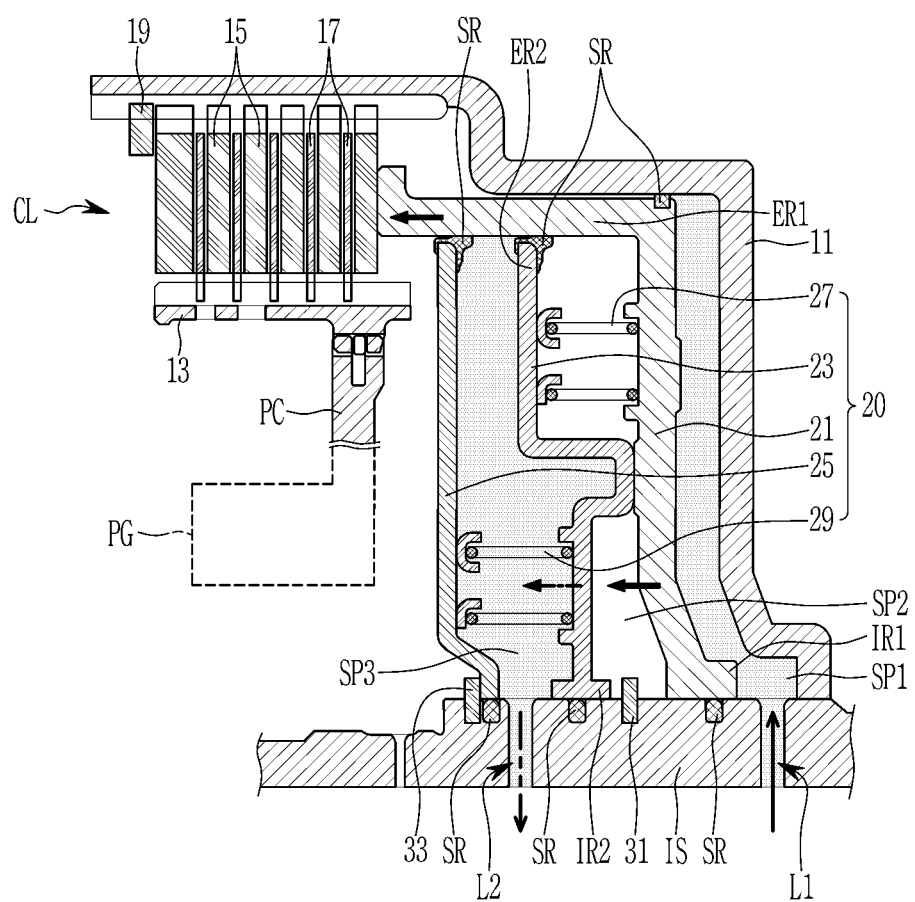
FIG. 3 is a cross-sectional view illustrating a second stage of a clutching device of an automatic transmission according to a first exemplary form of the present disclosure.
Figure 4:
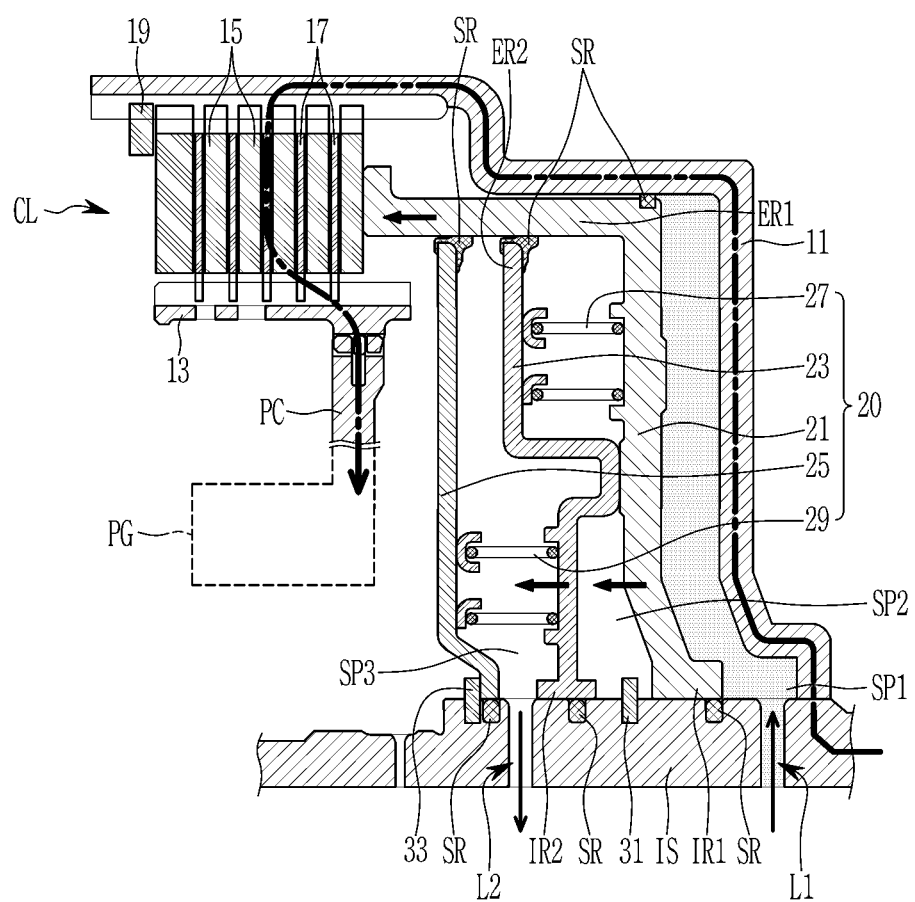
FIG. 4 is a cross-sectional view illustrating a third stage of a clutching device of an automatic transmission according to a first exemplary form of the present disclosure.

FIG. 2 is a cross-sectional view illustrating a first stage of a clutching device of an automatic transmission according to a first exemplary form of the present disclosure. FIG. 3 is a cross-sectional view illustrating a second stage of a clutching device of an automatic transmission according to a first exemplary form of the present disclosure. FIG. 4 is a cross-sectional view illustrating a third stage of a clutching device of an automatic transmission according to a first exemplary form of the present disclosure.

Operation of a clutching device according to an exemplary form is hereinafter described in detail with reference to FIG. 2, FIG. 3, and FIG. 4.

Referring to FIG. 2, the clutch drum 11 receives an input torque through the input shaft IS.

In this state, a hydraulic pressure is supplied to the first sealed space SP1 formed between the clutch drum 11 and the first piston 21 through the first hydraulic line L1, and thereby the first piston 21 immediately moves forward, i.e., toward the clutch CL. The first piston 21 moves very rapidly forward by the hydraulic pressure supplied to the first sealed space SP1 until the first piston 21 contacts the second piston 23. When the first piston 21 contacts the second piston 23, the plurality of clutch plates 15 and clutch disks 17 almost contact the snap ring 19, as shown in FIG. 2.

At the same time with applying a hydraulic pressure to the first sealed space SP1, a hydraulic pressure is also supplied to the third sealed space SP3 formed between the spring retainer 25 and the second piston 25 through the second hydraulic line L2, and thereby the hydraulic pressure in the third sealed space SP3 adds pressure on the second piston 23 against the first stopper 31.

Therefore, after the first piston 21 contacts the second piston 23, the second piston 23 is also applied with the hydraulic pressure in the third sealed space SP3 that acts against the hydraulic pressure in the first sealed space SP1. Consequently, an operating speed of the first piston 21 may be decreased after contacting the second piston 23, which means movement of the first piston 21 may be precisely controlled by controlling the hydraulic pressure in the third sealed space SP3 supplied through the second hydraulic line L2.

With reference to FIG. 3, when the hydraulic pressure supplied to the third sealed space SP3 through the second hydraulic line L2 is decreased, the second piston 23 moves toward the clutch CL together with the first piston 21 by the hydraulic pressure supplied to the first sealed space SP1 through the first hydraulic line L1, at a speed controlled by the hydraulic pressure supplied to the third sealed space SP3.

Therefore, a frontal end of the first piston 21 pushes the clutch plates 15 and clutch disks 17 toward the snap ring 19 such that the clutch plates 15 and clutch disks 17 are tightly pressed against each other.

Subsequently, referring to FIG. 4, when the hydraulic pressure supplied to the third sealed space SP3 through the second hydraulic line L2 is fully released, the frontal end of the first piston 21 fully pressurizes the clutch plates 15 and clutch disks 17, thereby forming a maximum engagement force of the clutch CL.

According to such a sequential operation of three stages by the first and second pistons 21 and 23, the clutch CL may achieve a rapid responsiveness and a sufficiently large engagement force for torque connection between the input shaft IS and the planet carrier PC of the planetary gear set PG.

In order to release the operation of the clutch CL, the hydraulic pressures supplied to the first sealed space SP1 through the first hydraulic line L1 is released, and the first and second pistons 21 and 23 starts to move rearward, i.e., to the right in the drawings, by the restoring force of the first and second return springs 27 and 29.

In the early stage of releasing the hydraulic pressure in the first sealed space SP1, fluid is not suddenly expelled from the first sealed space SP1, and the fluid remaining in the first sealed space SP1 is applied with centrifugal force. Thus, such a centrifugal force may deteriorate the releasing speed of the clutch CL.

In an exemplary form, in an early stage of releasing the operation of the clutch CL, a hydraulic pressure is supplied to the third sealed space SP3 through the second hydraulic line L2. Therefore, moving speed of the first and second pistons 21 and 23 is accelerated by the hydraulic pressure supplied to the third sealed space SP3. Thus, the hydraulic pressure supplied to the third sealed space SP3 acts as a compensation hydraulic pressure that cancels centrifugal forces applied to the remaining fluid in the first sealed space SP1, and therefore, reliability of control of a clutch may be enhanced while reducing drag loss of friction members in the clutch.

Figure 5:
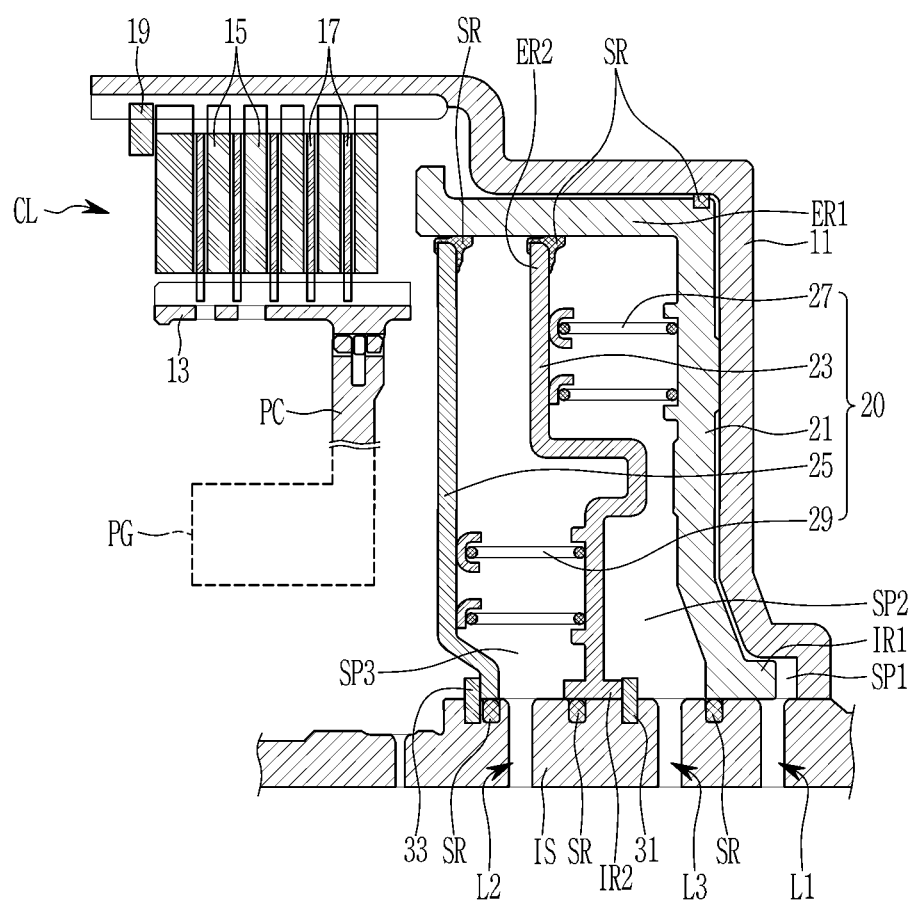
FIG. 5 is a cross-sectional view of a clutching device of an automatic transmission according to a second exemplary form of the present disclosure.

FIG. 5 is a cross-sectional view of a clutching device of an automatic transmission according to a second exemplary form of the present disclosure.

Referring to FIG. 5, a clutching device of an automatic transmission according to the second exemplary form is almost the same as the first exemplary form, except that a third hydraulic line L3 communicating with the second sealed space SP2 is formed in the input shaft IS at a location between the first and second hydraulic lines L1 and L2.

In such a clutching device according to the second exemplary form, in an early stage of releasing the operation of the clutch CL, a hydraulic pressure is also supplied to the second sealed space SP2 through the third hydraulic line L3 while a hydraulic pressure is supplied to the third sealed space SP3 through the second hydraulic line L2 as in the first form. Therefore, moving speed of the first and second pistons 21 and 23 is accelerated by the hydraulic pressures supplied to the second and third sealed spaces SP2 and SP3. Thus, the hydraulic pressures supplied to the second and third sealed spaces SP2 and SP3 act as a compensation hydraulic pressure that cancels centrifugal forces applied to the remaining fluid in the first sealed space SP1, and therefore, reliability of control of a clutch may be enhanced while reducing drag loss of friction members in the clutch.

As described above, according to a clutching device of the first and second exemplary forms, a shifting responsiveness is improved by rapid initial operating speed by employing dual pistons of the first and second pistons 21 and 23. In addition, precise control between friction members is enabled by precise control of the hydraulic pressure supplied to the second sealed space SP2.

Due to sequentially controlling of the first and second pistons 21 and 23, fatigue accumulation caused to the friction members may be significantly reduced, thereby reducing possibility of damage to the clutch CL.

In the case of releasing the clutch CL, drag loss of friction members may be reduces while enhancing reliability of controlling the clutch CL by cancelling centrifugal force of fluid remaining in spaces between the pistons and the clutch drum, since the returning operation of the pistons 21 and 23 initiated by return springs 27 and 29 is accelerated by the compensation hydraulic pressure supplied to a space between the spring retainer 25 and the second piston 23.

Since the return springs 27 and 29 initiate the returning operation of the pistons, unstableness of returning operation of pistons may be reduced by minimizing effect of unstableness of low initial hydraulic pressure when the hydraulic pressure is solely used for returning the pistons.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

<Description of symbols>

CL: clutch    11: clutch drum
13: clutch hub    15: clutch plate
17: clutch disk    19: snap ring <Description of symbols>

20: piston unit    21, 23: first and second pistons
25: spring retainer    27, 29: first and second return springs
31, 33: first and second stoppers    IS: input shaft
L1, L2, L3: first, second, and third hydraulic lines
SR: sealing    PC: planet carrier
SP1, SP2, SP3: first, second, and third sealed spaces
IR1, ER1: interior and exterior rims of first piston
IR2, ER2: interior and exterior rims of second piston

What is claimed is:

1. A clutching device of an automatic transmission, the clutching device comprising:
   a clutch drum connected with a first rotation element;
   a clutch connected with the clutch drum and also connected with a second rotation element to connect or disconnect torque delivery between the first rotation element and the second rotation element; and
   a piston unit configured to operate the clutch to connect the torque delivery between the first rotation element and the second rotation element,
   wherein the piston unit comprises:
      a first piston forming a first sealed space with the first rotation element and the clutch drum and configured to move toward the clutch to directly press the clutch by a hydraulic pressure supplied to the first sealed space through a first hydraulic line formed in the first rotation element;
      a second piston forming a second sealed space with the first piston and the first rotation element;
      a spring retainer arranged on the first rotation element and forming a third sealed space with the first and second pistons and the first rotation element;
      a second hydraulic line formed in the first rotation element and configured to supply a hydraulic pressure to the third sealed space;
      a first return spring disposed between the first piston and the second piston and configured to provide a first restoring force to the first and second pistons; and
      a second return spring disposed between the spring retainer and the second piston and configured to provide a second restoring force to the spring retainer and the second piston.

2. The clutching device of claim 1, wherein the piston unit further comprises a first stopper disposed on the first rotation element and arranged between the first piston and the second piston to limit a moving stroke of the second piston.

3. The clutching device of claim 2, wherein the first stopper is formed as a snap ring fitted on the first rotation element and arranged between the first hydraulic line and the second hydraulic line and limits a return direction stroke of the second piston.

4. The clutching device of claim 1, wherein:
   the spring retainer is abutted by a second stopper in a direction toward the clutch to support the second return spring, and tightly contacts an exterior rim of the first piston by interposing a seal; and
   the second hydraulic line is formed in the first rotation element at a location between the second piston and the spring retainer such that a compensation hydraulic pressure is formed in the third sealed space by receiving the hydraulic pressure through the second hydraulic line.

5. The clutching device of claim 4, wherein the second stopper is formed as a snap ring fitted on the first rotation element.

6. The clutching device of claim 1, wherein an exterior rim of the first piston is axially elongated in parallel with the clutch drum and slidably contacts the clutch drum by interposing a sealing.

7. The clutching device of claim 1, wherein interior rims of the first and second pistons are slidably arranged on the first rotation element and contact the first rotation element by interposing a sealing, respectively.

8. The clutching device of claim 7, wherein an exterior rim of the second piston is slidably contact an exterior rim of the first piston by interposing a sealing.

9. The clutching device of claim 1, wherein
the first rotation element is an input shaft that receives an output torque of an engine; and
the second rotation element is one rotation element of three rotation elements of a planetary gear set.

10. The clutching device of claim 1, wherein a third hydraulic line is formed in the first rotation element at a location between the first piston and the second piston and configured to supply a compensation hydraulic pressure to the second sealed space.

11. A clutching device of an automatic transmission, the clutching device comprising:
a clutch drum connected with an input shaft;
a clutch connected with the clutch drum and also connected with a rotation element of a planetary gear set and configured to connect or disconnect torque delivery between the input shaft and the rotation element; and
a piston unit configured to operate the clutch to connect or disconnect the torque delivery between the input shaft and the rotation element,
wherein the piston unit comprises:
a first piston forming a first sealed space with the input shaft and the clutch drum and configured to move toward the clutch to directly press the clutch by a hydraulic pressure supplied to the first sealed space through a first hydraulic line formed in the input shaft;
a second piston forming a second sealed space with the first piston and the input shaft;
a spring retainer arranged on the input shaft and forming a third sealed space with the first and second pistons and the input shaft;
a second hydraulic line formed in the input shaft and configured to supply a hydraulic pressure to the third sealed space;
a first stopper disposed on the input shaft and arranged between the first piston and the second piston to limit a moving stroke of the second piston;
a second stopper disposed on the input shaft and configured to abut the spring retainer;
a first return spring disposed between the first piston and the second piston and configured to provide a first restoring force to the first and second pistons; and
a second return spring disposed between the spring retainer and the second piston and configured to provide a second restoring force to the spring retainer and the second piston.

12. The clutching device of claim 11, wherein the first stopper is formed as a snap ring fitted on the input shaft and arranged between the first hydraulic line and the second hydraulic line and limits a return direction stroke of the second piston.

13. The clutching device of claim 11, wherein the second stopper is formed as a snap ring fitted on the input shaft.

14. The clutching device of claim 11, wherein a third hydraulic line is formed in the input shaft at a location between the first piston and the second piston and configured to supply a compensation hydraulic pressure to the second sealed space.

* * * * *